United States Patent
Yang et al.

(10) Patent No.: US 12,492,418 B2
(45) Date of Patent: Dec. 9, 2025

(54) METHOD FOR PREPARING THEAFLAVIN WITH IMMOBILIZED SUBSTRATE

(71) Applicant: NANTONG TEANOL BIOTECHNOLOGY CO., LTD., Jiangsu (CN)

(72) Inventors: Weiguo Yang, Nantong (CN); Yidan Zhou, Nantong (CN); Bo Zhu, Nantong (CN); Guangyong Zhou, Nantong (CN); Yintian Zhao, Nantong (CN); Huayang Guan, Nantong (CN)

(73) Assignee: NANTONG TEANOL BIOTECHNOLOGY CO., LTD., Nantong (CN)

( * ) Notice: Subject to any disclaimer, the term of this patent is extended or adjusted under 35 U.S.C. 154(b) by 0 days.

(21) Appl. No.: 19/032,240

(22) Filed: Jan. 20, 2025

(65) Prior Publication Data

US 2025/0263762 A1    Aug. 21, 2025

Related U.S. Application Data

(63) Continuation of application No. PCT/CN2024/073829, filed on Jan. 24, 2024.

(30) Foreign Application Priority Data

Jan. 19, 2024    (CN) .......................... 202410076949.3

(51) Int. Cl.
    *C12P 17/16*    (2006.01)
(52) U.S. Cl.
    CPC .................................. *C12P 17/162* (2013.01)

(58) Field of Classification Search
    None
    See application file for complete search history.

(56) References Cited

U.S. PATENT DOCUMENTS

2009/0298140 A1    12/2009    Singh et al.

FOREIGN PATENT DOCUMENTS

| CN | 101182319 | 5/2008 |
| CN | 102226211 | 10/2011 |

(Continued)

OTHER PUBLICATIONS

Wang Bin et al, "Study on Continuous Preparation of Theaflavins by Immobilized Polyphenol Enzyme in Packed Bed Reactor", Food and Fermentation Industry, vol. 37, Issue 5, May 31, 2011.

(Continued)

*Primary Examiner* — Robert J Yamasaki
*Assistant Examiner* — Charles Zoltan Constantine
(74) *Attorney, Agent, or Firm* — ARC IP Law, PC; Joseph J. Mayo

(57) ABSTRACT

Provided is a method for preparing a theaflavin using an immobilized substrate, including: enriching a catechin molecule substrate, a natural plant monomer, on an inert adsorption carrier in a non-covalent bonding manner; subjecting a resulting material to purification; and catalyzing polymerization of the catechin molecule substrate enriched on the carrier with a high-selectivity free exogenous enzyme to produce the dimeric substance of theaflavin. The purification and enzymatic oxidation condensation of the catechin substrate are integrated on a same carrier, which reduces the difficulty of process operations.

19 Claims, 2 Drawing Sheets

(56) References Cited

FOREIGN PATENT DOCUMENTS

| CN | 102827896 A | * | 12/2012 | | |
|---|---|---|---|---|---|
| CN | 104711248 A | | 6/2015 | | |
| CN | 106399417 | | 2/2017 | | |
| CN | 109536544 | | 3/2019 | | |
| CN | 109593736 | | 4/2019 | | |
| CN | 109593736 A | * | 4/2019 | ............ | C12P 17/162 |
| CN | 109762793 | | 5/2019 | | |
| CN | 113637038 A | * | 11/2021 | ............ | C07G 99/00 |
| CN | 114807264 A | | 7/2022 | | |

OTHER PUBLICATIONS

International Search Report and Written Opinion issued in PCT/CN2024/073829, dated Sep. 3, 2024, and English translations thereof.

Yue Kun, et al., "Study on Technology of Synthesizing Theaflavins through Enzyme-catalysing Oxidation with Immobilized Laccase;" Journal of Anhui Agri Sci. (2011), and English Abstract.

First Office Action issued in CN202410076949.3 on Jan. 22, 2025, and English translation thereof.

* cited by examiner

METHOD FOR PREPARING THEAFLAVIN WITH IMMOBILIZED SUBSTRATE

TECHNICAL FIELD

The present disclosure belongs to the technical field of biosynthesis, and in particular relates to a method for preparing a theaflavin using an immobilized substrate.

BACKGROUND

Theaflavin is a dimer product of catechin molecules, and also is a golden-yellow pigment found in black tea. Refined tea has an extremely-low theaflavin content, only 0.5% to 1.5%, resulting in a high extraction cost of theaflavin. Theaflavin is known as a "soft gold" in tea, and plays a wide range of roles in the medical and health care fields. Industrially, theaflavin is prepared mainly through endogenous enzymatic fermentation or exogenous enzymatic fermentation.

The endogenous enzymatic fermentation refers to that an endogenous polyphenol oxidase (PPO) and peroxidase (POD) in fresh tea is used to prepare a tea with a high theaflavin content through related technologies such as freezing and temperature-controlled fermentation, and then the tea is extracted and refined to obtain the theaflavin with a high-content. The exogenous enzymatic fermentation refers to that an exogenous enzyme source rich in PPOs is used for the enzymatic catalysis of catechins to prepare theaflavin. The existing exogenous enzyme catalysis technologies can be divided into the following two technical routes: free enzyme catalysis and immobilized enzyme catalysis.

The immobilized enzyme catalysis refers to that an extracted crude PPO is purified, then immobilized on an appropriate carrier through ion binding, biospecific interaction, intermolecular interaction, hydrophobic interaction, chelation, affinity binding, etc., and then a resulting material is contacted with a catechin-containing solution in a reaction system, such that, under oxygen participation and a suitable pH value, catechin molecules is polymerized under the catalysis of enzymes to produce theaflavin. In the immobilized enzyme catalysis process, an enzyme purification and immobilization cost is high, an immobilized enzyme can only be used few times, and a large amount of industrial waste is easily produced. During the purification and immobilization of PPO, the enzyme contacts and is bonded with a plurality of active sites of the carrier, such that a geometry of the enzyme is immobilized and a spatial configuration, a structure, and a conformation of the enzyme all change compared with that of the enzyme in a free state. In addition, the geometry of the enzyme immobilized on the carrier is difficult to change, such that it is difficult for the enzyme to change the catalytic selectivity for substrate catechins, especially for interfere the catalytic ability to ester catechins.

SUMMARY

An object of the present disclosure is to provide a method for preparing a theaflavin using an immobilized substrate. The method provided by the present disclosure solves the problems of the immobilized enzyme catalysis technology, and has a low cost and a prominent catalytic effect.

To achieve the above object, the present disclosure provides the following technical solutions:

Provided is a method for preparing a theaflavin using an immobilized substrate, including the following steps:

(1) mixing a tea polyphenol solution with an inert adsorption carrier and conducting adsorption to obtain an adsorbed material, and subjecting the adsorbed material to water-washing and alcohol-washing in sequence to obtain an immobilized substrate, wherein the inert adsorption carrier comprises a macroporous adsorption resin; the macroporous adsorption resin has a pore size of 10 Å to 180 Å; and an alcohol solution for the alcohol-washing has a concentration of 4 wt % to 20 wt %;

(2) mixing the immobilized substrate with an enzyme solution, and conducting an enzymatic reaction by introducing oxygen to obtain an enzyme-catalytic carrier, wherein an enzyme in the enzyme solution is polyphenol oxidase (PPO); and (3) subjecting the enzyme-catalytic carrier to desorption to obtain an eluate, and concentrating the eluate to obtain the theaflavin.

In some embodiments, in step (1), the tea polyphenol solution has a concentration of 0.5 g/L to 100 g/L.

In some embodiments, in step (1), a mass ratio of a tea polyphenol in the tea polyphenol solution to the inert adsorption carrier is in a range of 3:100 to 15:100.

In some embodiments, in step (1), the adsorption is conducted at a temperature of 5° C. to 35° C. and a pH of 4.0 to 5.5 for 1 hour to 5 hours.

In some embodiments, in step (1), the macroporous adsorption resin includes one or more selected from the group consisting of an LX-8 resin, an LX-5 resin, an AB-8 resin, an NKA resin, and an NKA-9 resin; and the inert adsorption carrier further includes one or more selected from the group consisting of a silica gel and aluminum oxide.

In some embodiments, in step (1), the tea polyphenol solution is prepared by a process comprising process 1, process 2, or process 3, the process 1 comprising the following step: subjecting a tea to extraction in hot water at a temperature of 65° C. to 90° C. under stirring;

the process 2 comprising the following step: mixing a commercially-available tea polyphenol powder having a content of 30 wt % to 99 wt % with water; and the process 3 comprising the following step: subjecting a tea polyphenol solution with a concentration lower than the target concentration to enrichment.

In some embodiments, in the process 1, the extraction is conducted one or more times, and each time of extraction is conducted for 20 min to 60 min; and the tea is one or more selected from the group consisting of a big-leaf green tea and a small-leaf green tea.

In some embodiments, in the process 2, the commercially-available tea polyphenol powder having the content of 30 wt % to 99 wt % includes one or more selected from the group consisting of a tea polyphenol TP30 product to a tea polyphenol TP99 product that are commercially available.

In some embodiments, in step (2), a volume ratio of the immobilized substrate to the enzyme solution is in a range of 0.5-1:0.5-1.

In some embodiments, in step (2), the enzymatic reaction is conducted for 4 hours to 8 hours under conditions of a temperature of 5° C. to 35° C., a pH of 4.5 to 6.5, and an oxygen volume concentration of 60% to 90%.

In some embodiments, a progress of the enzymatic reaction is monitored by testing an absorbance value of an alcohol extraction solution of the immobilized substrate at 380 nm;

where testing the alcohol extraction solution of the immobilized substrate is conducted as follows: taking an immobilized substrate sample every 30 min; mixing the immobilized substrate sample with ethanol to obtain a mixture; subjecting the mixture to extraction by ultrasonic shaking at ambient temperature to yield a supernatant, and collecting the supernatant; and determining an absorbance value of the supernatant at 380 nm, where the enzymatic reaction is stopped when the absorbance value stops arising.

In some embodiments, in step (2), the enzyme solution is one selected from the group consisting of PPO from Novozymes, a laccase from Cangzhou Xiasheng Enzyme Biotechnology Co., Ltd., a pear juice produced through homogenization and filtration of a pear, and a crude enzyme solution produced through homogenization and filtration of a fresh tea.

In some embodiments, the pear is a snow pear; and the homogenization and filtration of the pear is conducted as follows: subjecting the snow pear to freezing and thawing in sequence to produce a thawed snow pear, mixing the thawed snow pear with a pH buffer to obtain a mixed material, subjecting the mixed material to homogenizing to obtain a slurry, and filtering the slurry with four layers of a gauze to remove a pear residue.

In some embodiments, a mass ratio of the snow pear to the pH buffer is in a range of 1:0.2 to 1:1; and a pH value of the pH buffer is in a range of 5.5 to 6.5.

In some embodiments, the pH buffer is a disodium hydrogen phosphate-sodium dihydrogen phosphate buffer.

In some embodiments, in the step (3), an eluent for the desorption is edible ethanol with a concentration of 60 wt % to 80 wt %.

The present disclosure provides a method for preparing a theaflavin using an immobilized substrate. In the method provided by the present disclosure, the catalytic polymerization is conducted using the immobilized substrate. A catechin molecule substrate, a natural plant monomer, is enriched on an inert adsorption carrier in a non-covalent bonding manner, which achieves non-bonding immobilization, and forms a multi-molecule aggregation state. Then, the purification (water-washing and low-concentration alcohol-washing) is conducted, and a high-selectivity free exogenous PPO solution is added for catalysis. A spatial configuration of a molecular structure of a protein chain of free PPO in an aqueous solution is stretched, which enables a high catalytic activity for ester catechins and non-ester catechins. In addition, the substrate is mostly locked on the inert adsorption carrier; thus, a concentration of a free substrate in the enzyme solution is low, resulting in that the toxic and inhibitory effects of the substrate to the enzyme are greatly reduced. In a microdynamic equilibrium of elution-catalytic polymerization-adsorption, the polymerization of the catechin substrate enriched on the carrier is efficiently catalyzed to produce the dimeric substance of theaflavin. The present disclosure creatively integrates the purification and enzymatic oxidation condensation of the catechin substrate on a same carrier, which greatly reduces the difficulty of process operations and enables simple operations.

The present disclosure creatively proposes a method of catalytic synthesis of the theaflavin using the immobilized substrate. Subsequently, a theaflavin-enriched resin can be simply vacuum-dried and then used as a basic template to conduct grafting modification of molecular functional groups. The present disclosure provides a new idea for enrichment, purification, immobilization of low-concentration functional small-molecule substances, and for targeted catalytic synthesis of functional macromolecules, which has a promising development prospect.

Compared with prior arts, the method provided by the present disclosure is eco-friendly, does not cause the production of toxic and hazardous waste such as spent immobilized enzymes, and does not require ethyl acetate and petroleum ether that are strongly toxic and also flammable and explosive. In addition, toxic and hazardous haloalkanes are not adopted in a process of removing caffeine and impurities. Moreover, a high-content tea polyphenol (an immobilized substrate) and a high-content theaflavin can be produced on a same production line. Thus, the present disclosure lays a foundation for the subsequent operations such as molecular modification of active group molecules with a theaflavin as a substrate.

Further, in step (1), the adsorption is conducted at a temperature of 5° C. to 35° C. and a pH of 4.0 to 5.5 for 1 h to 5 h. In step (2), the enzymatic reaction is conducted at a temperature of 5° C. to 35° C., a pH of 4.5 to 6.5, and an oxygen volume concentration of 60% to 90% for 4 h to 8 h. The method provided by the present disclosure involves mild operating conditions, is conducive to safe production, and can reduce the energy consumption and production cost.

BRIEF DESCRIPTION OF THE DRAWINGS

To describe the technical solutions in the embodiments of the present disclosure or in the prior art clearly, the accompanying drawings required for the embodiments are briefly described below. Apparently, the accompanying drawings in the following description show merely some embodiments of the present disclosure, and those skilled in the art may still derive other accompanying drawings from these accompanying drawings without creative efforts.

DETAILED DESCRIPTION OF THE EMBODIMENTS

Figure 1:
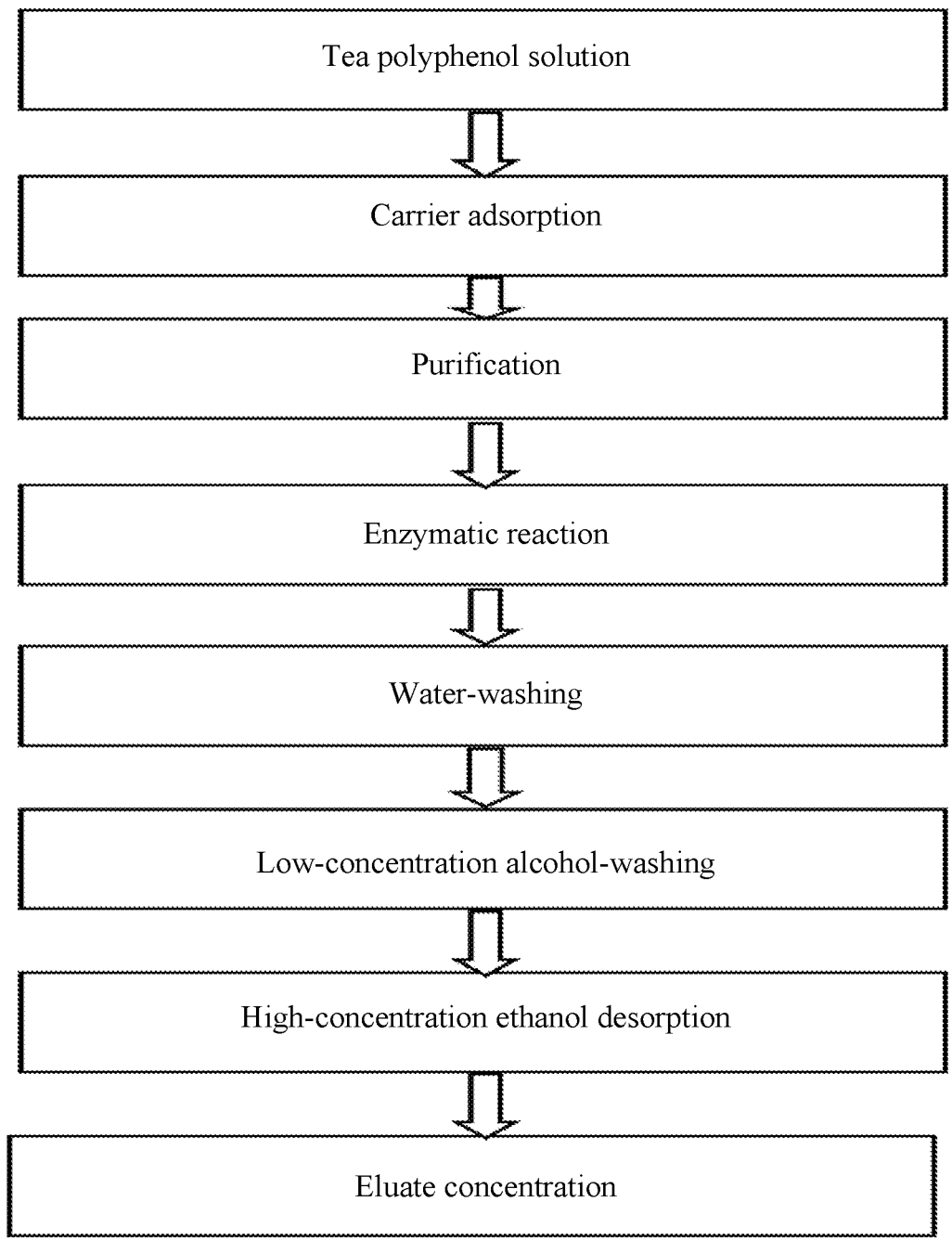
FIG. 1 shows a flow chart of the method for preparing a theaflavin using an immobilized substrate according to an embodiment of the present disclosure.

The present disclosure provides a method for preparing a theaflavin using an immobilized substrate, including the following steps:

(1) mixing a tea polyphenol solution with an inert adsorption carrier and conducting adsorption to obtain an adsorbed material, and subjecting the adsorbed material to water-washing and alcohol-washing in sequence to obtain an immobilized substrate, wherein the inert adsorption carrier comprises a macroporous adsorption resin; the macroporous adsorption resin has a pore size of 10 Å to 180 Å; and an alcohol solution for the alcohol-washing has a concentration of 4 wt % to 20 wt %;

(2) mixing the immobilized substrate with an enzyme solution, and conducting an enzymatic reaction by introducing oxygen to obtain an enzyme-catalytic carrier, wherein an enzyme in the enzyme solution is polyphenol oxidase (PPO); and (3) subjecting the enzyme-catalytic carrier to desorption to obtain an eluate, and concentrating the eluate to obtain the theaflavin.

In the present disclosure, a tea polyphenol solution is mixed with an inert adsorption carrier (which is denoted as first mixing) and adsorption is then conducted to obtain an adsorbed material, and the adsorbed material is subjected to water-washing and alcohol-washing in sequence to obtain an immobilized substrate. In the present disclosure, in some embodiments, the tea polyphenol solution has a concentration of 0.5 g/L to 100 g/L.

In the present disclosure, in some embodiments, the tea polyphenol solution is prepared by a process including process 1, process 2, or process 3. In some embodiments, the process 1 includes the following step: subjecting a tea to extraction in hot water at a temperature of 65° C. to 90° C. under stirring. In some embodiments, the extraction is conducted one or more times and preferably two or more times. In some embodiments, each time of extraction is conducted for 20 min to 60 min, preferably 30 min to 50 min, and more preferably 40 min. In some embodiments, the tea is one or more selected from the group consisting of a big-leaf green tea and a small-leaf green tea. In some embodiments, the big-leaf green tea is a big-leaf green tea of Fuding in the Fujian province. In some embodiments, the small-leaf green tea is a small-leaf green tea of Wuyuan in the Jiangxi province.

In the present disclosure, in some embodiments, the process 2 includes the following step: mixing a commercially-available tea polyphenol powder having a content of 30 wt % to 99 wt % with water. In some embodiments, the commercially-available tea polyphenol powder having the content of 30 wt % to 99 wt % includes one or more selected from the group consisting of a tea polyphenol TP30 product to a tea polyphenol TP99 product that are commercially available.

In the present disclosure, in some embodiments, the process 3 includes the following step: subjecting a tea polyphenol solution with a concentration lower than the target concentration to enrichment.

In the present disclosure, the inert adsorption carrier includes a macroporous adsorption resin. The macroporous adsorption resin has a pore size of 10 Å to 180 Å. In some embodiments, the macroporous adsorption resin includes one or more selected from the group consisting of an LX-8 resin, an LX-5 resin, an AB-8 resin, an NKA resin, and an NKA-9 resin. In some embodiments, the inert adsorption carrier further includes one or more selected from the group consisting of a silica gel and aluminum oxide. In the present disclosure, the inert adsorption carrier can be one or more macroporous adsorption resins, or can be silica gel and/or aluminum oxide, etc. There is a wide range of sources for the inert adsorption carrier.

In the present disclosure, in some embodiments, a mass ratio of a tea polyphenol in the tea polyphenol solution to the inert adsorption carrier is in a range of 3:100 to 15:100, preferably 5:100 to 12:100, more preferably 7:100 to 10:100, and further preferably 8:100 to 9:100.

In the present disclosure, in some embodiments, the first mixing is conducted under stirring. In some embodiments, the stirring is conducted at a rotational speed of 1 rpm to 200 rpm, and preferably 10 rpm to 100 rpm, and more preferably 30 rpm.

In the present disclosure, in some embodiments, the adsorption is conducted at a temperature of 5° C. to 35° C., preferably 10° C. to 30° C., more preferably 15° C. to 25° C., and further preferably 20° C. In some embodiments, the adsorption is conducted at a pH of 4.0 to 5.5, and preferably 4.5 to 5.0. In some embodiments, the adsorption is conducted for 1 h to 5 h, preferably 2 h to 4 h, and more preferably 3 h. In the present disclosure, the tea polyphenol solution is mixed with the inert adsorption carrier under stirring to complete the aggregation and adsorption for the tea polyphenol.

In the present disclosure, in some embodiments, water adopted for the water-washing is pure water. In some embodiments, the water-washing is completed when a resulting washing solution is basically colorless. In the present disclosure, the water-washing is conducted to remove polysaccharide impurities.

In the present disclosure, in some embodiments, an alcohol solution for the alcohol-washing has a concentration of 4 wt % to 20 wt %, preferably 8 wt % to 15 wt %, and more preferably 10 wt % to 14 wt %. In some embodiments, the alcohol solution is edible ethanol. In the present disclosure, the alcohol-washing is conducted to remove impurities such as caffeine and water-soluble amino acids that interfere with the subsequent enzymatic catalytic reaction.

In the present disclosure, after the alcohol-washing, a resulting system is subjected to filtration to collect the inert adsorption carrier for later use.

In the present disclosure, after the immobilized substrate is obtained, the immobilized substrate is mixed with an enzyme solution (which is denoted as second mixing), and an enzymatic reaction is conducted by introducing oxygen to obtain an enzyme-catalytic carrier. In the present disclosure, in some embodiments, the enzyme solution is PPO from Novozymes, or a laccase from Cangzhou Xiasheng Enzyme Biotechnology Co., Ltd., or a pear juice produced through homogenization and filtration of a pear, or a crude enzyme solution produced through homogenization and filtration of a fresh tea.

In the present disclosure, in some embodiments, the pear is a snow pear. In some embodiments, the homogenization and filtration of the pear is conducted as follows: subjecting the snow pear to freezing and thawing in sequence to produce a thawed snow pear, mixing the thawed snow pear with a pH buffer, subjecting a resulting material to homogenizing to obtain a slurry, and filtering the slurry with four layers of a gauze to remove a pear residue. In some embodiments, the thawing refers to natural thawing. In some embodiments, a mass ratio of the snow pear to the pH buffer is in a range of 1:0.2 to 1:1, preferably 1:0.4 to 1:0.8, and more preferably 1:0.6. in some embodiments, a pH value of the pH buffer is in a range of 5.5 to 6.5, preferably 5.5 to 6.0, and more preferably 5.5. In some embodiments, the pH buffer is a disodium hydrogen phosphate-sodium dihydrogen phosphate buffer.

In the present disclosure, in some embodiments, the enzyme solution has a concentration of 20 wt % to 100 wt %, preferably 50 wt % to 100 wt %, and more preferably 80 wt % to 100 wt %.

In the present disclosure, in some embodiments, a volume ratio of the immobilized substrate to the enzyme solution is in a range of (0.5-1): (0.5-1), preferably (0.6-0.9): (0.6-0.9), and more preferably (0.7-0.8): (0.7-0.8).

In the present disclosure, in some embodiments, the second mixing is conducted under stirring. In some embodiments, the stirring is conducted at a rotational speed of 30 rpm to 600 rpm, preferably 100 rpm to 500 rpm, and more preferably 400 rpm to 500 rpm.

In the present disclosure, a speed for introducing the oxygen should preferably be controlled to avoid the overflow of a foam from a reaction system.

In the present disclosure, in some embodiments, the enzymatic reaction is conducted at a temperature of 5° C. to 35° C., preferably 10° C. to 30° C., more preferably 15° C. to 25° C., and further preferably 20° C. In some embodiments, the enzymatic reaction is conducted at a pH of 4.5 to 6.5, preferably 5.0 to 6.0, and more preferably 5.5. In some embodiments, the enzymatic reaction is conducted at an oxygen volume concentration of 60% to 90%, and preferably 70% to 80%. In some embodiments, the enzymatic reaction is conducted for 4 h to 8 h, preferably 5 h to 7 h, and more preferably 6 h.

In the present disclosure, in some embodiments, a progress of the enzymatic reaction is monitored by testing an absorbance value of an alcohol extraction solution of the immobilized substrate under a light with a wavelength of 380 nm. In some embodiments, testing the alcohol extraction solution of the inert adsorption carrier is conducted as follows: taking an immobilized substrate sample (wet) every 30 min; mixing the immobilized substrate sample with ethanol, subjecting a resulting mixture to extraction by ultrasonic shaking at ambient temperature to yield a supernatant. 10 mL of the supernatant is pipetted and tested for an absorbance value at 380 nm. The enzymatic reaction is stopped when the absorbance value stops arising.

In the present disclosure, in some embodiments, a mass of the immobilized substrate sample is 2 g; a volume of the ethanol is 50 mL; a volume concentration of the ethanol is 95%; and the extraction under ultrasonic shaking is conducted for 5 min. In some embodiments, after being pipetted, the 10 mL of the supernatant is added to a 50 mL volumetric flask, and the ethanol with a volume concentration of 95% is added to a specified scale mark. In the present disclosure, in some embodiments, ethanol with the volume concentration of 95% is adopted as a blank control.

In the present disclosure, after the enzyme-catalytic carrier is obtained, subjecting the enzyme-catalytic carrier to desorption to obtain an eluate, and concentrating the eluate to obtain the theaflavin. In the present disclosure, in some embodiments, an eluent for the desorption is edible ethanol with a concentration of 60 wt % to 80 wt %, and preferably edible ethanol with a concentration of 70 wt % to 75 wt %.

In the present disclosure, in some embodiments, before the desorption, the enzyme-catalytic carrier is subjected to water-washing and alcohol-washing in sequence. In some embodiments, water adopted for the water-washing is pure water. In some embodiments, an alcohol adopted for the alcohol-washing is edible ethanol with a concentration of 5 wt % to 20 wt %, and preferably edible ethanol with a concentration of 10 wt % to 15 wt %. In the present disclosure, the water-washing and the alcohol-washing are conducted for impurity removal to purify the enzyme-catalytic carrier.

In the present disclosure, in some embodiments, the concentration is a vacuum concentration. In some embodiments, a number of times of the vacuum concentration is 10 to 20, preferably 12 to 18, and more preferably 14 to 16. In some embodiments, a vacuum degree is-0.1 MPa. In some embodiments, a target solid content for the concentration is 30 wt % to 40 wt %, and preferably 35 wt % to 37 wt %.

In the present disclosure, in some embodiments, after the concentration, a resulting concentrate is dried. In some embodiments, the drying is freeze-drying, spray-drying, or vacuum-drying. In some embodiments, a device for the vacuum-drying is a vacuum belt drier.

FIG. 1 shows a flow chart of the method for preparing a theaflavin using an immobilized substrate of the present disclosure. In the method, a tea polyphenol solution is adsorbed with an inert adsorption carrier and then purified, then an oxygen is introduced to perform an enzymatic reaction, then water-washing and alcohol-washing are conducted for impurity removal, an enzyme-catalytic carrier carrying a product is subjected to desorption to obtain an eluate, and the eluate is concentrated to obtain the theaflavin.

In order to further illustrate the present disclosure, the solutions of the present disclosure are described in detail below in connection with the accompanying drawings and examples, but these examples should not be construed as limiting the scope of the present disclosure.

Example 1

(1) 100 g of a big-leaf green tea powder of Fuding in the Fujian province, China was weighed and subjected to extraction in 1 L of 90° C. pure water twice for 30 min each time, and each extract solution was collected through filtration. Two extract solutions were combined, adjusted with phosphoric acid to a pH of 4.0 to 5.5, and cooled to ambient temperature to obtain a tea extract solution for later use.

(2) At ambient temperature, the tea extract solution was added to 100 g of an LX-8 resin, stirring was conducted at a rotational speed of 30 rpm, and adsorption was conducted for 2 h. A remaining solution was removed through filtration to obtain an extract-adsorbed resin. The extract-adsorbed resin was washed with 1 L of pure water under stirring 4 times for 10 min each time until a resulting washing solution was basically clear and colorless, and the washing solution was removed through filtration to obtain a washed resin. The washed resin was further washed with 1 L of a 6% edible ethanol aqueous solution under stirring 3 times for 10 min each time, and a resulting ethanol washing solution was removed through filtration to obtain an earthy-yellow purified resin for later use.

(3) 100 g of a snow pear was taken, frozen, and then naturally thawed, and 100 mL of a disodium hydrogen phosphate-sodium dihydrogen phosphate buffer with a pH of 5.5 was added. Homogenization was conducted, then filtration was conducted with four layers of a gauze to obtain a pear residue and a pear juice. The pear residue was removed and the pear juice was collected for later use.

(4) The pear juice was poured into the earthy-yellow purified resin obtained in step (2). At 30° C., stirring was conducted at a rotational speed of 400 rpm, and an oxygen was introduced at a rate of 1 L/min. During the stirring, a resin sample was collected every 30 min and subjected to extraction with ethanol, and detected for an absorbance value at 380 nm. The absorbance linearly increased and then remained stable. A reaction was stopped when the absorbance remained stable. After the reaction was completed, a beautiful orange-red resin was produced.

(5) The remaining pear juice reaction solution was removed through filtration (a detected enzyme activity of the reaction solution was merely 10% of an initial value). The orange-red resin was washed in pure water adjusted with phosphoric acid to a pH of 4 under stirring 5 times until a resulting washing solution was clear and colorless, and then the washing solution was removed through filtration to obtain a water-washed orange-red resin.

(6) The water-washed orange-red resin was washed with 1 L of a 15% edible ethanol aqueous solution under stirring 3 times for 10 min each time, and the final ethanol washing solution was removed through filtration as much as possible to obtain an alcohol-washed orange-red resin.

(7) The alcohol-washed orange-red resin was loaded into a column, and a theaflavin adsorbed on the alcohol-washed orange-red resin was eluted with 80% edible ethanol to obtain an eluate. The eluate was vacuum-concentrated by a rotary evaporator for drying to obtain 8.2 g of a golden-orange powder. Based on a weight of the tea, a yield of the golden-orange powder is 8.2%. A total catechin content in the tea is 12.6%, and a yield of the total catechin content is 65%. The product was tested by HPLC, and the product has a theaflavin content of 53.6%.

Example 2

(1) 100 g of a small-leaf green tea powder of Wuyuan in the Jiangxi province, China was weighed and subjected to extraction in 1 L of 90° C. pure water twice for 30 min each time, and each extract solution was collected through filtration. Two extract solutions were combined, adjusted with phosphoric acid to a pH of 4.0 to 5.5, and cooled to ambient temperature to obtain a tea extract solution for later use.

(2) At ambient temperature, the tea extract solution was added to 100 g of an LX-5 resin, stirring was conducted at a rotational speed of 30 rpm, and adsorption was conducted for 2.5 h. A remaining solution was removed through filtration to obtain an extract-adsorbed resin. The extract-adsorbed resin was washed with 1 L of pure water under stirring 4 times for 10 min each time until a resulting washing solution was basically colorless, and the washing solution was removed through filtration to obtain a washed resin. The washed resin was further washed with 1 L of a 5% edible ethanol aqueous solution under stirring 3 times for 10 min each time, and a resulting ethanol washing solution was removed through filtration to obtain an earthy-yellow purified resin for later use.

(3) 100 g of a snow pear was taken, frozen, and then naturally thawed, and 50 mL of a disodium hydrogen phosphate-sodium dihydrogen phosphate buffer with a pH of 5.5 was added. Homogenization was conducted, then filtration was conducted with four layers of a gauze to obtain a pear residue and a pear juice. The pear residue was removed and the pear juice was collected for later use.

(4) The pear juice was poured into the earthy-yellow purified resin obtained in step (2). At 30° C., stirring was conducted at a rotational speed of 400 rpm, and an oxygen was introduced at a rate of 1 L/min. During the stirring, a resin sample was collected every 30 min and subjected to extraction with ethanol, and detected for an absorbance value at 380 nm. The absorbance linearly increased and then remained stable. A reaction was stopped when the absorbance remained stable. After the reaction was completed, a beautiful orange-red resin was produced.

(5) The remaining pear juice reaction solution was removed through filtration (a detected enzyme activity of the reaction solution was merely 11% of an initial value). The orange-red resin was washed in pure water adjusted with phosphoric acid to a pH of 4 under stirring 5 times until a resulting washing solution was clear and colorless, and then the washing solution was removed through filtration to obtain a water-washed orange-red resin.

(6) The water-washed orange-red resin was washed with 1 L of a 12% edible ethanol aqueous solution under stirring 3 times for 10 min each time, and the final ethanol washing solution was removed through filtration as much as possible to obtain an alcohol-washed orange-red resin.

(7) The alcohol-washed orange-red resin was loaded into a column, and a theaflavin adsorbed on the alcohol-washed orange-red resin was eluted with 80% edible ethanol to obtain an eluate. The eluate was vacuum-concentrated by a rotary evaporator for drying to obtain 7.6 g of a golden-orange powder. Based on a weight of the tea, a yield of golden-orange powder is 7.6%. A total catechin content in the tea is 11.3%, and a yield of the total catechin content is 67%. The product was tested by HPLC, and the product has a theaflavin content of 56.7%.

Example 3

(1) 10 g of a commercially-available tea polyphenol TP90 product with a low caffeine content was weighed and dissolved in 200 mL of pure water to obtain a tea polyphenol solution. The TP90 product had an epigallocatechin gallate (EGCG) content of not less than 40%, an epigallocatechin (EGC) content of not less than 10%, a total catechin content of 71%, and a caffeine content of not greater than 1%.

(2) At ambient temperature, the tea polyphenol solution was added to 100 g of an AB-8 resin, a pH was adjusted with phosphoric acid to 4, stirring was conducted at a rotational speed of 30 rpm, and adsorption was conducted for 2 h. A remaining solution was removed through filtration to obtain a tea polyphenol-adsorbed resin. The tea polyphenol-adsorbed resin was washed with 1 L of pure water under stirring 2 times for 5 min each time until a resulting washing solution was basically colorless, and the washing solution was removed through filtration to obtain a brownish-yellow purified resin for later use.

(3) 100 g of a snow pear was taken, frozen, and then naturally thawed, and 50 mL of a disodium hydrogen phosphate-sodium dihydrogen phosphate buffer with a pH of 5.5 was added. Homogenization was conducted, then filtration was conducted with four layers of a gauze to obtain a pear residue and a pear juice. The pear residue was removed and the pear juice was collected for later use.

(4) The pear juice was poured into the brownish-yellow purified resin obtained in step (2). At 30° C., stirring was conducted at a rotational speed of 500 rpm, and an oxygen was introduced at a rate of 1 L/min. During the stirring, a resin sample was collected every 30 min and subjected to extraction with ethanol, and detected for an absorbance value at 380 nm. The absorbance linearly increased and then remained stable. A reaction was stopped when the absorbance remained stable. After the reaction was completed, a beautiful dark orange-red resin was produced.

(5) The remaining pear juice reaction solution was removed through filtration (a detected enzyme activity of the reaction solution was merely 4% of an initial value). The dark orange-red resin was washed 4 times in pure water adjusted with phosphoric acid to a pH of 4 until a resulting washing solution was clear and colorless, and then the washing solution was removed through filtration to obtain a water-washed dark orange-red resin.

(6) The water-washed dark orange-red resin was washed with 1 L of a 10% edible ethanol aqueous solution under stirring 3 times for 10 min each time, and the final ethanol washing solution was removed through filtration as much as possible to obtain an alcohol-washed dark orange-red resin.

(7) The alcohol-washed dark orange-red resin was loaded into a column, and a theaflavin adsorbed on the alcohol-washed dark orange-red resin was eluted with 65% edible ethanol to obtain an eluate. The eluate was vacuum-concentrated by a rotary evaporator for drying to obtain 7.5 g of a golden-orange powder. A yield of the tea polyphenol is 75%. The product was tested by HPLC, and the product has a theaflavin content of 62.7%.

Example 4

(1) 10 g of a commercially-available tea polyphenol TP95 product with a low caffeine content was weighed and dissolved in 200 mL of pure water to obtain a tea polyphenol solution. The TP95 product had an EGCG content of not less than 45%, an EGC content of not less than 10%, a total catechin content of 75.6%, and a caffeine content of not greater than 1%.

(2) At ambient temperature, the tea polyphenol solution was added to 100 g of an NKA-9 resin, a pH was adjusted with phosphoric acid to 4, stirring was conducted at a rotational speed of 30 rpm, and adsorption was conducted for 2 h. A remaining solution was removed through filtration to obtain a tea polyphenol-adsorbed resin. The tea polyphenol-adsorbed resin was washed with 1 L of pure water under stirring 3 times for 5 min each time until a resulting washing solution was basically colorless, and the washing solution was removed through filtration to obtain a brownish-yellow purified resin for later use.

(3) 100 g of a snow pear was taken, frozen, and then naturally thawed, and 30 mL of a disodium hydrogen phosphate-sodium phosphate buffer with a pH of 5.5 was added. Homogenization was conducted, then filtration was conducted with four layers of a gauze to obtain a pear residue and a pear juice. The pear residue was removed and the pear juice was collected for later use.

(4) The pear juice was poured into the brownish-yellow purified resin obtained in step (2). At 30° C., stirring was conducted at a rotational speed of 500 rpm, and an oxygen was introduced at a rate of 1 L/min. During the stirring, a resin sample was collected every 30 min and subjected to extraction with ethanol, and detected for an absorbance value at 380 nm. The absorbance linearly increased and then remained stable. A reaction was stopped when the absorbance remained stable. After the reaction was completed, a beautiful dark orange-red resin was produced.

(5) The remaining pear juice reaction solution was removed through filtration (a detected enzyme activity of the reaction solution was merely 4% of an initial value). The dark orange-red resin was washed 4 times in pure water adjusted with phosphoric acid to a pH of 4 until a resulting washing solution was clear and colorless, and then the washing solution was removed through filtration to obtain a water-washed dark orange-red resin.

(6) The water-washed dark orange-red resin was washed with 1 L of a 15% edible ethanol aqueous solution under stirring 3 times for 10 min each time, and the final ethanol washing solution was removed through filtration as much as possible to obtain an alcohol-washed dark orange-red resin.

(7) The alcohol-washed dark orange-red resin was loaded into a column, and a theaflavin adsorbed on the alcohol-washed dark orange-red resin was eluted with 75% edible ethanol to obtain an eluate. The eluate was vacuum-concentrated by a rotary evaporator for drying to obtain 7.3 g of a golden-yellow powder. A yield of the tea polyphenol is 73%. The product was tested by HPLC, and the product has a theaflavin content of 63.9%.

Figure 2:
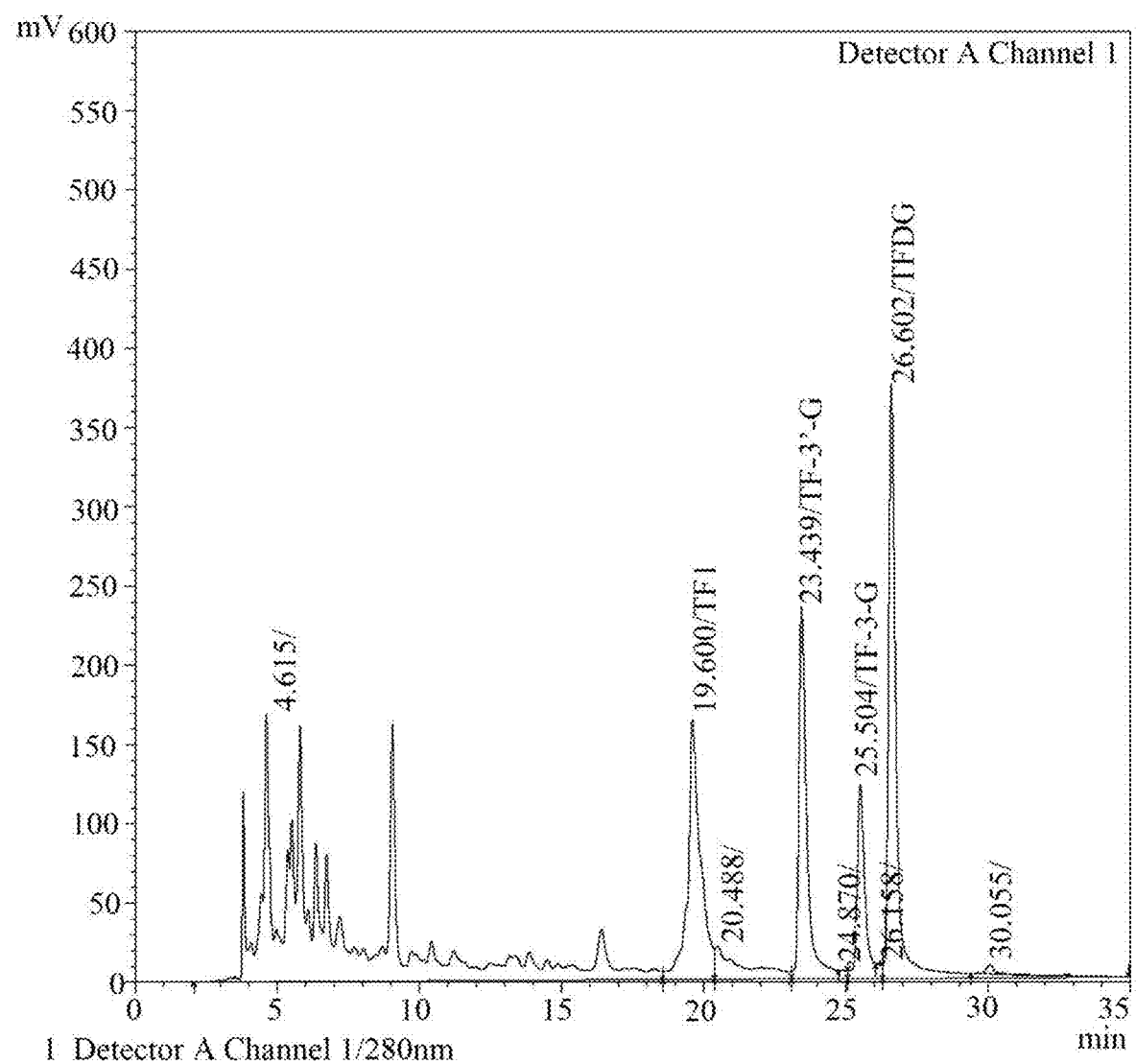
FIG. 2 shows a high-performance liquid chromatography (HPLC) spectrum of the theaflavin prepared in Example 4 of the present disclosure.

The theaflavin prepared in this example was detected by HPLC. A high-performance liquid chromatograph with the following model was adopted: a Shimadzu LC-10ATVP system controller, an LC-10ATVP dual pump, an SPD-M20A diode array detector, and a Shimadzu LC-Solution chromatography workstation. Chromatographic analysis parameters were as follows: a chromatographic column: a Hypersil BDS (C18, 5μ, 4.6×250 mm) column; a mobile phase A: 2% acetic acid; a mobile phase B: acetonitrile-ethyl acetate (volume ratio: 21:3); gradient elution: the mobile phase B linearly changes from 18% to 30% within 30 min; a flow rate: 0.9 mL/min; a column temperature: 40° C.; a detection wavelength: 280 nm; and an injection volume: 10 μL. Standards for four monomeric components of the theaflavin were purchased, and a standard calibration curve was constructed by an external standard method. A detected spectrum was shown in FIG. 2. It can be seen from FIG. 2 that the present disclosure adopts an immobilized substrate-based free enzyme-catalytic technology to prepare the following four balanced theaflavins: TF, TF-3-G, TF-3'-G, and TFDG, indicating that the method provided by the present disclosure has a high enzyme catalytic efficiency.

It can be seen from the above examples that the method provided by the present disclosure has a low cost and a prominent catalytic effect, involves simple steps and convenient operations, greatly reduces the difficulty of process operations, and is eco-friendly.

Although the present disclosure has been described in detail through the above examples, the examples are merely some rather than all of the examples of the present disclosure. Other examples can be obtained based on these examples without creative efforts, and these examples shall fall within the scope of the present disclosure.

What is claimed is:

1. A method for preparing a theaflavin using an immobilized substrate, comprising:

(1) mixing a tea polyphenol solution with an inert adsorption carrier and conducting adsorption to obtain an adsorbed material, and subjecting the adsorbed material to water-washing and alcohol-washing in sequence to obtain an immobilized substrate, wherein the inert adsorption carrier comprises a macroporous adsorption resin; the macroporous adsorption resin has a pore size of 10 Å to 180 Å; and an alcohol solution for the alcohol-washing has a concentration of 4 wt % to 20 wt % alcohol;

(2) mixing the immobilized substrate with an enzyme solution, and conducting an enzymatic reaction by introducing oxygen to obtain an enzyme-catalytic carrier, wherein an enzyme in the enzyme solution is polyphenol oxidase (PPO); and (3) subjecting the enzyme-catalytic carrier to desorption to obtain an eluate, and concentrating the eluate to obtain the theaflavin.

2. The method of claim 1, wherein in step (1), the tea polyphenol solution has a concentration of 0.5 g/L to 100 g/L.

3. The method of claim 2, wherein in step (1), a mass ratio of a tea polyphenol in the tea polyphenol solution to the inert adsorption carrier is in a range of 3:100 to 15:100.

4. The method of claim 2, wherein in step (1), the tea polyphenol solution is prepared by a process comprising process 1, process 2, or process 3:
the process 1 comprising: subjecting a tea to extraction in hot water at a temperature of 65° C. to 90° C. under stirring;
the process 2 comprising: mixing a tea polyphenol powder having a tea polyphenol content of 30 wt % to 99 wt % with water; and
the process 3 comprising: subjecting a tea polyphenol solution with a concentration lower than a target concentration to enrichment.

5. The method of claim 1, wherein in step (1), a mass ratio of a tea polyphenol in the tea polyphenol solution to the inert adsorption carrier is in a range of 3:100 to 15:100.

6. The method of claim 1, wherein in step (1), the adsorption is conducted at a temperature of 5° C. to 35° C. and a pH of 4.0 to 5.5 for 1 hour to 5 hours.

7. The method of claim 1, wherein in step (1), the macroporous adsorption resin comprises one or more selected from the group consisting of an LX-8 resin, an LX-5 resin, an AB-8 resin, an NKA resin, and an NKA-9 resin; and
the inert adsorption carrier further comprises one or more selected from the group consisting of a silica gel and aluminum oxide.

8. The method of claim 1, wherein in step (1), the tea polyphenol solution is prepared by a process comprising process 1, process 2, or process 3:
the process 1 comprising: subjecting a tea to extraction in hot water at a temperature of 65° C. to 90° C. under stirring;
the process 2 comprising: mixing a tea polyphenol powder having a tea polyphenol content of 30 wt % to 99 wt % with water; and
the process 3 comprising: subjecting a tea polyphenol solution with a concentration lower than a target concentration to enrichment.

9. The method of claim 8, wherein in the process 1, the extraction is conducted one or more times, and each time of extraction is conducted for 20 min to 60 min; and the tea is one or more selected from the group consisting of a big-leaf green tea and a small-leaf green tea.

10. The method of claim 1, wherein in step (2), a volume ratio of the immobilized substrate to the enzyme solution is in a range of 0.5-1:0.5-1.

11. The method of claim 10, wherein in step (2), the enzymatic reaction is conducted for 4 hours to 8 hours under conditions of a temperature of 5° C. to 35° C., a pH of 4.5 to 6.5, and an oxygen volume concentration of 60% to 90%.

12. The method of claim 1, wherein in step (2), the enzymatic reaction is conducted for 4 hours to 8 hours under conditions of a temperature of 5° C. to 35° C., a pH of 4.5 to 6.5, and an oxygen volume concentration of 60% to 90%.

13. The method of claim 1, wherein a progress of the enzymatic reaction is monitored by testing an absorbance value of an alcohol extraction solution of the immobilized substrate at 380 nm;
wherein testing the alcohol extraction solution of the immobilized substrate is conducted as follows:
taking an immobilized substrate sample every 30 min;
mixing the immobilized substrate sample with ethanol to obtain a mixture;
subjecting the mixture to extraction by ultrasonic shaking at ambient temperature to yield a supernatant, and collecting the supernatant; and
determining an absorbance value of the supernatant at 380 nm, wherein the enzymatic reaction is stopped when the absorbance value stops arising.

14. The method of claim 1, wherein in step (2), the enzyme solution comprises a pear juice produced through homogenization and filtration of a pear, or a crude enzyme solution produced through homogenization and filtration of a fresh tea.

15. The method of claim 14, wherein the pear is a snow pear; and the homogenization and filtration of the pear is conducted as follows: subjecting the snow pear to freezing and thawing in sequence to produce a thawed snow pear, mixing the thawed snow pear with a pH buffer to obtain a mixed material, subjecting the mixed material to homogenizing to obtain a slurry, and filtering the slurry with four layers of a gauze to remove a pear residue.

16. The method of claim 15, wherein a mass ratio of the snow pear to the pH buffer is in a range of 1:0.2 to 1:1; and a pH value of the pH buffer is in a range of 5.5 to 6.5.

17. The method of claim 16, wherein the pH buffer is a disodium hydrogen phosphate-sodium dihydrogen phosphate buffer.

18. The method of claim 15, wherein the pH buffer is a disodium hydrogen phosphate-sodium dihydrogen phosphate buffer.

19. The method of claim 1, wherein in step (3), an eluent for the desorption is edible ethanol with a concentration of 60 wt % to 80 wt %.

* * * * *